Jan. 1, 1963

J. J. ECKL ET AL 3,071,699

CONTROL CIRCUIT

Filed March 23, 1959

INVENTORS
CHARLES F. MEYER
JAMES J. ECKL
BY
William H. Schmeling

United States Patent Office 3,071,699

Patented Jan. 1, 1963

3,071,699
CONTROL CIRCUIT

James J. Eckl, Milwaukee, and Charles F. Meyer, Wauwatosa, Wis., assignors to Square D Company, Detroit, Mich., a corporation of Michigan Filed Mar. 23, 1959, Ser. No. 801,237
11 Claims. (Cl. 307—88.5)

Figures 1, 2:
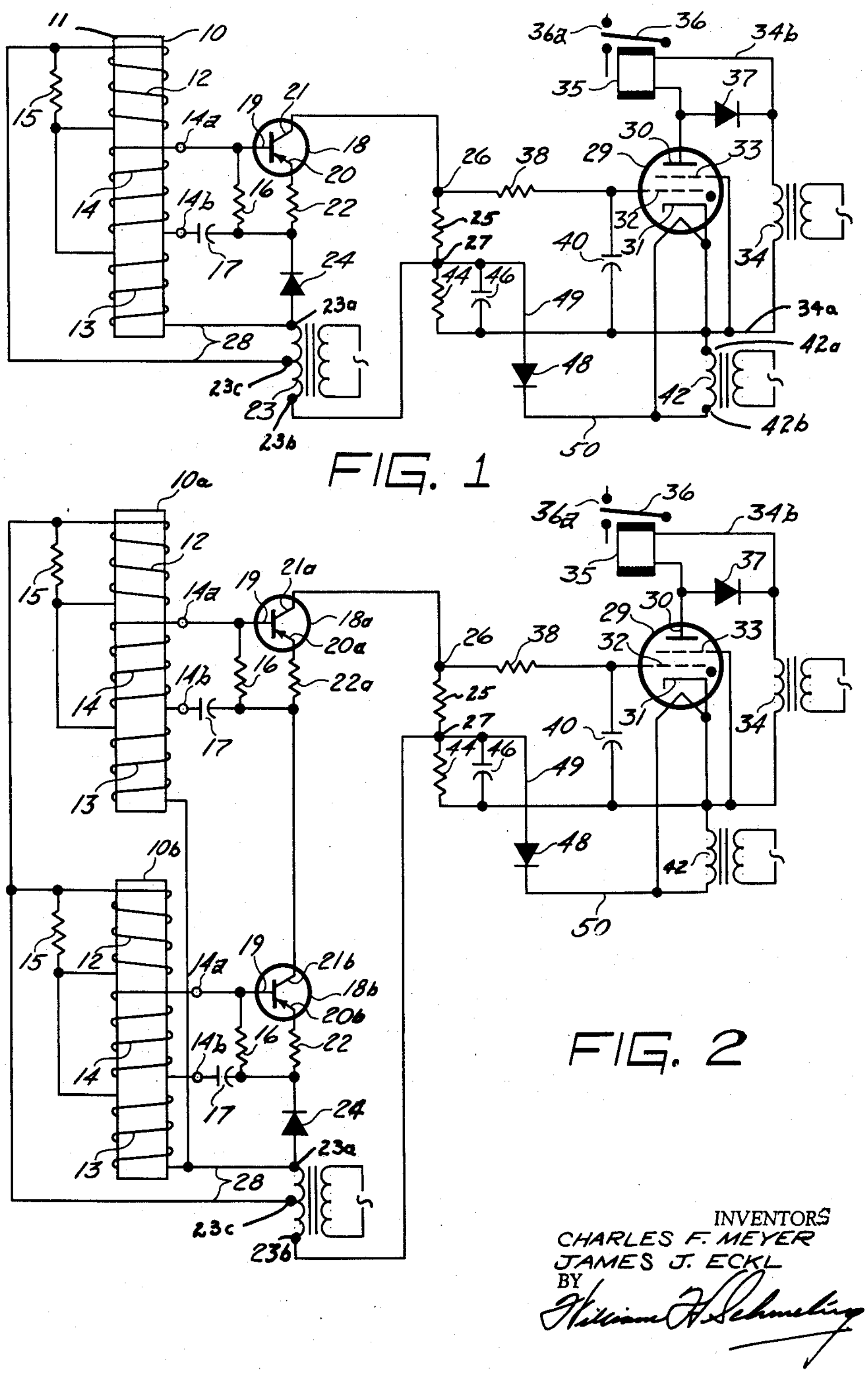

This invention relates to control circuits and is more particularly concerned with circuitry which will permit metal detectors to exercise logic functions.

In an application for patent, Serial No. 609,683, filed September 13, 1956, now Patent No. 2,915,699, a metal detector and the circuitry therefor is described. This application, which has been assigned to the assignee of the present invention, discloses the constructional details of one form of a metal detector which may be used with the circuitry according to the present invention. The detector described has an output coil which provides a continuous output minimum signal of alternating current. The signal provided by the output coil is the resultant sum of the voltages induced therein by a pair of driving coils which are wound and energized so the respective voltages induced thereby in the pickup or output coil are out of direct phase opposition by a predetermined angle. When a metal object is moved into the vicinity of the detector and in proximity to one of the driving coils, the magnetic coupling between that driving coil and the output coil will be increased and cause a corresponding increase in voltage induced by that driving coil in the pickup coil. This change in voltage, as explained in the application supra, will cause a relatively large change in the phase angle of the resultant voltage output signal of the output coil. In FIG. 10 of the drawings of the application supra, a transistor is connected to act as an amplifier between a source of substantially constant direct current potential and the output coil of the detector. In the circuit according to the present invention, the transistor serves in an additional capacity, as it acts as a phase sensitive detector as well as an amplifier.

It is an object therefore of the present invention to provide a new and novel circuit for a metal detector.

A further object of the present invention is to combine a transistorized circuit with a metal detector, which circuit will utilize the output signal of the metal detector to achieve a logic function.

Another object of the present invention is to combine the signals from a plurality of metal detectors in a transistorized circuit wherein each of the detectors has a transistor associated therewith and to connect the transistors in series to provide a circuit which will have an "AND" logic function.

A still further object is to utilize a transistor as a phase detector and amplifier in a metal detector circuit. This object is achieved by impressing an alternating current signal between the base and one of the principal electrodes of the transistor and applying a direct current of spaced voltage pulses between the principal electrodes. Thus the transistor will be rendered conductive when the voltages of the two sources have the same polarity and rendered non-conductive when the voltages are of opposite polarity.

In carrying out the above object, it is another object to arrange the circuit components so the metal detector will provide a "NOT" and "AND" logic function.

Further objects and features of the invention will be readily apparent to those skilled in the art from the specification and appended drawing illustrating certain preferred embodiments in which:

FIG. 1 diagrammatically illustrates a basic circuit arrangement according to the present invention.

FIG. 2 diagrammatically shows the circuitry in FIG. 1 as combined to achieve an "AND" logic function.

In the drawings, FIG. 1 particularly, the numeral 10 designates a metal detector preferably of the type disclosed in the application supra. The metal detector 10 has a core 11 of ferromagnetic material on which are mounted two driving coils 12 and 13 which are spaced on the opposite ends thereof. Positioned between the driving coils 12 and 13 on the ferromagnetic core is a pickup or output coil 14. Also included in the metal detector 10 is a resistance 15 for adjusting the balance between the voltages induced in the pickup coil by the output coils 12 and 13. The output leads of the output coil 14 are connected at terminals **14*a* and 14*b* to a resistance 16 and a capacitance 17 as shown. The capacitance 17 serves to filter the harmonics and voltage ripples which may be present on the voltage wave from the output coil 14** and will also cause a predetermined shift in the voltage wave, as well as to slightly resonate the series circuit thereby increasing the circulating current, as will be hereinafter explained.

The phase detector and amplifier means for the metal detector circuit according to the present invention includes transistor 18, having a base 19, an emitter 20, and a collector 21. The base 19 of the transistor 18 is connected to one end of the output coil 14 at the junction **14*a* and the emitter 20 is connected through an emitter bias resistance 22 and the capacitor 17 to the other end of the output coil 14 at the terminal 14*b*. A secondary winding 23 of a transformer which is energized by a suitable source of alternating current, as shown, has one of its end terminals 23*a* connected through a single diode 24 and the resistance 22 to the emitter 20. The other end terminal 23*b* of the transformer secondary 23 is connected through a junction 27, a load resistance 25 and a junction 26 to the collector 21 of the transistor 18. It is clearly apparent that the secondary winding 23 and the diode 24 will provide a source of half wave rectified alternating current between the emitter 20 and collector 21 of transistor 18. This rectified alternating current will appear across the transistor 18 as a direct current which has a series of positive voltage pulses which are spaced in accordance with the the frequency of the alternating current. The center tap 23*c* and one of the end terminals 23*a* of transformer 23 are connected to energize the driving coils 12 and 13**.

The output control means for the metal detector circuit according to the present invention includes a thyratron 29 and an anode 30, a cathode 31, a control grid 32 and a shield grid 33. A transformer energized from the source of alternating current, as shown, has a secondary winding 34 having one end terminal connected through a bus **34*a* to the cathode 31 and the other end terminal connected through a lead 34*b* and an actuating coil 35 of a relay with the anode 30. The relay is provided with an armature 36 that is arranged to close the contacts 36*a* in the conventional manner whenever the relay coil 35 is energized. Connected across the relay coil 35 is a diode 37. The diode 37 is included in the circuit basically to ensure quite relay operation and will momentarily delay the opening of the relay contacts 36*a* after the coil 35 is de-energized. As shown in the drawings, the junction 26 is connected through a current limiting resistor 38 to the grid 32. Connected between the grid 32 and the cathode is a filter capacitor 40. The heater for the cathode 31 of the thyratron 29 is energized by a secondary winding 42 of a transformer which is enerized through its primary winding from a suitable alternating current source as shown. The winding 42 also provides the necessary energy for charging a capacitor 46 which normally biases the thyratron 29 from conduction. One end 42*a* of the winding 42 is connected to the bus 34a and a parallel circuit, consisting of a resistance 44 and a capacitance 46 to the junction 27 and a lead 49 which in turn is connected through a diode 48 to a lead 50 which is connected to the other end 42b of the tranformer winding 42. It is clearly apparent that the output voltage of the winding 42 will be rectified by the diode 48 and charge the capacitor 46 to a potential determined by the voltage drop across resistance 44. One terminal of the capacitor 46 is connected through bus 34a with the cathode 31 while the other terminal of the capacitor 46 is connected through junction 27, resistance 25, junction 26 and resistance 38 to the grid 32. The diode 48 is connected in the circuit with transformer secondary 42 to charge the capacitor 46 and make the grid 32 negative relative to the cathode 31 and thus the tube 29 will normally be biased against conduction. The shield grid 33 is tied to the cathode 31 by bus 34a. Therefore when the grid 32 is rendered positive relative to the cathode, in a manner which will hereinafter explained, the tube 29** will be rendered conductive.

It is well known that a transistor will be rendered conductive when the base to emitter polarity coincides with the collector to emitter polarity. As was previously indicated, the transistor 18 is supplied with half wave rectified direct current consisting of a series of spaced positive voltage pulses. The output coil 14 of the metal detector provides a continuous output signal of alternating current. Therefore, if the phases of the respective voltages across the transistor 18 are properly adjusted as by adjusting the value of the capacitance 17, then the positive portions of the alternating current voltage wave from the output coil 14 as impressed between the base 19 and the emitter 20 will occur during the intervals between the positive pulses supplied to the emitter 20 and collector 21 of the transistor. Therefore the transistor 18 will be maintained non-conductive. However, as previously explained, the voltage wave from the output coil 14 across the base 19 and emitter 20 is shifted because of a presence of a metal object adjacent one of the driving coils. This shift or displacement of the voltage waves will be such that the polarity between the base 19 and emitter 20 and the collector 21 and emitter 20 of the transistor 18 will coincide. Thus the transistor 18 will be rendered conductive. The conduction of transistor 18 will cause a flow of direct current from the source 23 through the diode 24, emitter 20, and collector 21 to cause a voltage drop to appear across the resistor 25 which voltage drop is opposite to and sufficient to overcome the bias supplied by capacitor 46 on the grid 32 thereby causing the grid 32 of the thyratron 29 to become positive relative to its cathode 31. Thus the thyratron will be rendered conductive. When the thyratron conducts, current will flow from the transformer winding 34 through the actuating coil 35 of the relay to cause the armature 36 to be moved to close the contacts 36a. In this connection it is to be noted that the transistor 18 because of its arrangement in the circuit, acts as both an amplifier and a phase detector to control the output power circuit which includes a relay, thyratron 29, which are energized from the secondary winding 34.

The resistances 16 and 22 are included basically to compensate the transistor 18 for ambient temperature variations in the manner well known to those skilled in the art. As previously indicated, the capacitor 17 is selected to slightly resonate in the circuit which includes the output coil, the resistance 22, the emitter 20, and base 19. This arrangement will increase the current flow in the base circuit during the periods when the transistor 18 is conducting.

In the circuit heretofore described, the thyratron tube 29 will be normally non-conducting and will be rendered conductive when a metallic object is moved into the proximity of the metal detector 10. If the lead connecting the driving coils 13 and 12 to end terminal 23a of the transformer secondary is changed so the driving coils 12 and 13 are connected to the end terminal 23b, the phase of the voltages generated in the output coil 14 will be reversed. This arrangement will cause the voltage peaks between the emitter 20 and base 19 and the emitter 20 and collector 21 to be in co-incidence during periods when a metal object is absent from the vicinity of the metal detector 10. Thus, when a metal object is moved into the vicinity of the metal detector 10, the voltage of the output coil 14 will be shifted and the voltage peaks will occur during the intervals when the spaced half wave rectified voltage peaks which are impressed across the emitter to collector of the transistor. In other words, when a metal object is detected by the metal detector 10, the voltages across the transistor will be out of co-incidence and the transistor will become non-conductive to provide a "NOT" logic function.

In the circuitry shown in FIG. 2, corresponding numerals refer to corresponding components and functions thereof as described in connection with the embodiment shown in FIG. 1.

In the embodiment shown in FIG. 2, a pair of metal detectors 10a and 10b are utilized to perform an "AND" function. The circuit is arranged so a metal object must be present in the vicinity of both metal detectors 10a and 10b before the thyratron 29 will be conductive in the manner heretofore explained. The output coils 14 of each of the metal detectors are connected to the transistors 18a and 18b as previously explained. The transistors 18a and 18b are connected in series with the transformer 23 and the diode 24; that is, the collector 21b of transistor 18b is connected to the emitter 20a of transistor 18a and the collector 21a of transistor 18a is connected through junction 26, resistance 25, and junction 27 to the terminal 23b of transformer 23. From the description of the preceding embodiment it is clearly apparent that if metal objects are moved into the presence of both of the metal detectors 10a and 10b, then both transistors 18a and 18b will become simultaneously conductive so as to render the thyratron 29 conductive in the manner heretofore explained. However, should a metal object be moved into the presence of only one of the metal detectors, then one of the transistors will remain non-conductive and the thyratron 29 likewise will remain non-conductive. In this connection it is to be appreciated that if desired, one of the detectors 10a or 10b may be reversed so that the absence of a metal object will cause the corresponding transistor to become conductive and that more than two metal detector circuits may be connected in series so that the "AND" function accomplished will be responsive to more than two metal detectors. As in the preceding embodiment, the driving coils for the metal detectors are energized from the center tap of transformer 23. It is clearly apparent that a separate source of energization may be utilized for these driving coils, if desired.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. The combination comprising: a plurality of metal detectors each having an output coil providing alternating current output voltage pulses which vary in phase in response to the presence of a metal object in the vicinity of the detector, a transistor connected to each of the output coils, a source of half wave rectified alternating current, a series circuit including each of the transistors and said source, and means responsive to current flow in the circuit for controlling an output circuit.

2. The combination comprising: a plurality of metal detectors each having an output coil arranged to provide a change in phase in the voltage of an alternating current signal in response to the presence of a metal object in the vicinity of the metal detectors, a plurality of transistors each having a base, emitter and collector with the base thereof connected to an output coil, a source of half wave rectified A.C. current, and a circuit connecting the emitters and collectors of the transistors in series with each other and in series with the source whereby each of said transistors controls the current flow in said circuit in response to changes in phase of the signal from the output coil.

3. The combination recited in claim 2 including a means responsive to current flow in the circuit which means is arranged to provide a control function in response to said current flow.

4. In a detecting system, the combination comprising: a plurality of metal detectors each arranged to provide an alternating current signal in response to the presence of metal in the vicinity of the detector, a separate transistor for each detector connected to be rendered conductive in response to the signals from the detector, a single source of half wave rectified alternating current, and circuit means connecting all of the transistors and the half wave rectified alternating current source in a series circuit whereby all of the transistors must be simultaneously rendered conductive before current flow occurs in the circuit.

5. The combination comprising: an alternating current source including a transformer winding having an intermediate tap and a pair of end taps, a transducer having a driving coil connected across the intermediate tap and one of said end taps and an output coil inductively coupled to the driving coil to provide an output signal of alternate positive and negative polarities, means connected across said end taps to provide a direct current source providing a current flow of spaced positive polarities, a transistor having a pair of principal electrodes and a control electrode with the pair of principal electrodes connected across the direct current source and the control electrode and one of the principal electrodes connected to the output coil of the transducer to be responsive to the output signal and means responsive to the current flow from the direct current source through the transistor for controlling a control circuit.

6. The combination comprising: an alternating current source including a secondary transformer winding having an intermediate tap, a magnetic transducer connected across a portion of the secondary winding including the tap for producing a variable magnetic field and an alternating current voltage signal having a phase angle which varies in response to disturbances of the magnetic field by a metal object, means connected across the winding for providing a source of half wave rectified alternating current providing spaced voltage pulses, and means including a transistor having a base and emitter connected to be responsive to the voltage signal and a collector and the emitter connected to receive the voltage pulses of the A.C. source, said transistor being arranged to be rendered conductive when the base and emitter have the same polarity as the collector to emitter.

7. The combination as recited in claim 6 wherein the transistor is rendered conductive in response to the presence of a metal object in the vicinity of the metal detector.

8. The combination as recited in claim 6 wherein the transistor is rendered nonconductive in response to the presence of a metal object in the vicinity of the metal detector.

9. The combination comprising: an alternating current source including a tapped secondary transformer winding, a metal detector connected to be energized by a portion of the winding and having an output coil providing a second alternating current source having output voltage pulses which vary in phase in response to the presence of a metal object in the vicinity of the detector, means connected across the winding providing a third source of half wave rectified alternating current providing spaced voltage pulses of predetermined polarity, a transistor having a base, collector and emitter, said transistor being rendered conductive when the polarity across the base and emitter coincides with the polarity across the collector and emitter, a first circuit connecting the base and emitter to the coil, a second circuit connecting the emitter and collector to the source of spaced voltage pulses, said second alternating current source and said third source being arranged so the voltage pulses in said first circuit have a predetermined polarity during intervals between the voltage pulses in the second circuit whereby the conduction of the transistor is controlled by the variations in phase of the voltages from the coil.

10. The combination as recited in claim 9 wherein a plurality of individual metal detectors each has an output coil connected to a transistor which have their principal electrodes connected in a series circuit with the third source.

11. The combination as recited in claim 10 wherein a single control means is connected to be responsive to current flow in the series circuit.

References Cited in the file of this patent

UNITED STATES PATENTS

| | | |
|---|---|---|
| 2,489,920 | Michel | Nov. 29, 1949 |
| 2,791,730 | Stout | May 7, 1957 |
| 2,820,143 | D'Nelly et al. | Jan. 14, 1958 |
| 2,897,379 | Hinsdale | July 28, 1959 |
| 2,900,506 | Whetter | Aug. 18, 1959 |
| 2,959,687 | Eckert | Nov. 8, 1960 |